(12) United States Patent
Klein et al.

(10) Patent No.: US 12,377,410 B2
(45) Date of Patent: Aug. 5, 2025

(54) STRUCTURED CATALYST

(71) Applicant: TOPSOE A/S, Kgs. Lyngby (DK)

(72) Inventors: Robert Klein, Roskilde (DK); Anders Helbo Hansen, Espergærde (DK); Michael Boe, Klampenborg (DK); Peter Mølgaard Mortensen, Roskilde (DK); Søren Gyde Thomsen, Kgs. Lyngby (DK)

(73) Assignee: TOPSOE A/S, Kgs. Lyngby (DK)

( * ) Notice: Subject to any disclaimer, the term of this patent is extended or adjusted under 35 U.S.C. 154(b) by 552 days.

(21) Appl. No.: 17/997,286

(22) PCT Filed: Jun. 24, 2021

(86) PCT No.: PCT/EP2021/067344
§ 371 (c)(1),
(2) Date: Oct. 27, 2022

(87) PCT Pub. No.: WO2021/260108
PCT Pub. Date: Dec. 30, 2021

(65) Prior Publication Data
US 2023/0166247 A1 Jun. 1, 2023

(30) Foreign Application Priority Data
Jun. 26, 2020 (EP) ..................... 20182507

(51) Int. Cl.
*B01J 35/33* (2024.01)
*B01J 15/00* (2006.01)
(Continued)

(52) U.S. Cl.
CPC ............. *B01J 35/33* (2024.01); *B01J 15/005* (2013.01); *B01J 19/0013* (2013.01); *B01J 19/2485* (2013.01); *B01J 35/56* (2024.01);
*C01B 3/047* (2013.01); *C01B 3/22* (2013.01); *C01B 3/34* (2013.01); *C07B 35/04* (2013.01);
(Continued)

(58) Field of Classification Search
CPC . B01J 35/33; B01J 35/56; B01J 15/005; B01J 2219/00135
See application file for complete search history.

(56) References Cited

U.S. PATENT DOCUMENTS

2004/0120871 A1 6/2004 De et al.
2005/0142049 A1 6/2005 Amsden
(Continued)

FOREIGN PATENT DOCUMENTS

WO 2013169019 A1 11/2013
WO 2019228796 A1 12/2019
(Continued)

OTHER PUBLICATIONS

European Search Report issued in corresponding Application No. EP 20 18 2507 dated Oct. 23, 2020.
International Search Report (PCT/ISA/210) and Written Opinion (PCT/ISA/237) mailed on Aug. 20, 2021, by the European Patent Office as the International Searching Authority for International Application No. PCT/EP2021/067344.
(Continued)

*Primary Examiner* — Lessanework Seifu
(74) *Attorney, Agent, or Firm* — Boone IP Law

(57) ABSTRACT

A structured catalyst for catalyzing an endothermic reaction of a feed gas to convert it to a product gas Including at least one macroscopic structure of an electrically conductive material and at least one connector attached to the at least one macroscopic structure, wherein the macroscopic structure supports a catalytically active material.

21 Claims, 9 Drawing Sheets

(51) Int. Cl.
    *B01J 19/00*     (2006.01)
    *B01J 19/24*     (2006.01)
    *B01J 35/56*     (2024.01)
    *C01B 3/04*     (2006.01)
    *C01B 3/22*     (2006.01)
    *C01B 3/34*     (2006.01)
    *C07B 35/04*     (2006.01)

(52) U.S. Cl.
    CPC .............. *B01J 2219/00135* (2013.01); *B01J 2219/00155* (2013.01); *C01B 2203/0233* (2013.01); *C01B 2203/0277* (2013.01); *C01B 2203/085* (2013.01); *C01B 2203/1023* (2013.01); *C01B 2203/1223* (2013.01); *C01B 2203/1241* (2013.01)

(56) References Cited

U.S. PATENT DOCUMENTS

2008/0302030 A1    12/2008    Stancel
2012/0321530 A1    12/2012    Pranda

FOREIGN PATENT DOCUMENTS

WO    2019228797 A1    12/2019
WO    2019228798 A1    12/2019

OTHER PUBLICATIONS

First Office Action with English translation mailed on May 24, 2024, by the China National Intellectual Property Administration for Chinese Application No. 202180045688.3, 18 pages.

STRUCTURED CATALYST

TECHNICAL FIELD

A structured catalyst, a reactor system and a process for carrying out an endothermic reaction of a feed gas are provided, where heat for the endothermic reaction is provided by resistance heating.

BACKGROUND

Synthesis gas production typically takes place in large chemical plants, due to the energy intensive reactions needed to facilitate the production. This makes small scale production difficult. The toxicity of the synthesis gas (especially due to the content of carbon monoxide), additionally, makes storage of the synthesis gas difficult and imposes a significant risk.

There is the need for on-demand synthesis gas production in smaller plants.

SUMMARY

In a first aspect, a structured catalyst for catalyzing an endothermic reaction of a feed gas to convert it to a product gas is provided, said structured catalyst comprising at least one macroscopic structure of an electrically conductive material and at least one connector attached to the at least one macroscopic structure, wherein the macroscopic structure supports a catalytically active material, the macroscopic structure extending in a longitudinal direction from a first end to a second end, where said first end forms an inlet to said macroscopic structure for said feed gas and said second end forms an outlet for said product gas, said macroscopic structure comprising a circumferential wall encircling an internal space, wherein the connector comprises first engagement means for engaging an outer surface of the circumferential wall of a first macroscopic structure, wherein the engagement means has an inner surface with a shape matching at least a part of the outer surface of the circumferential wall, wherein the engagement means is attached to the outer surface of the circumferential wall by an interference fit, wherein the structured catalyst comprises at least two macroscopic structures, wherein the connector comprises at least two engagement means each engaging one of said macroscopic structures, and wherein the inner surfaces of said engagement means are arranged so as to allow said macroscopic structures to extend parallel to the longitudinal direction.

In a further aspect, a reactor system for carrying out an endothermic reaction of a feed gas is provided, said reactor system comprising:
 a) a structured catalyst according to the first aspect;
 b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
 c) a heat insulation layer between said structured catalyst and said pressure shell.

In a further aspect, use of the structured catalyst according to the first aspect or the reactor according to the second aspect is provided, wherein the endothermic reaction is selected from the group consisting of steam methane reforming, hydrogen cyanide formation, methanol cracking, ammonia cracking, reverse water gas shift and dehydrogenation.

Additional aspects of the present technology are set out in the following detailed description, the figures, and the appended claims.

LEGENDS TO THE FIGURES

FIG. 7b illustrates a sectional view of the connector illustrated in FIG. 7a;

DETAILED DISCLOSURE

Figure 1A:
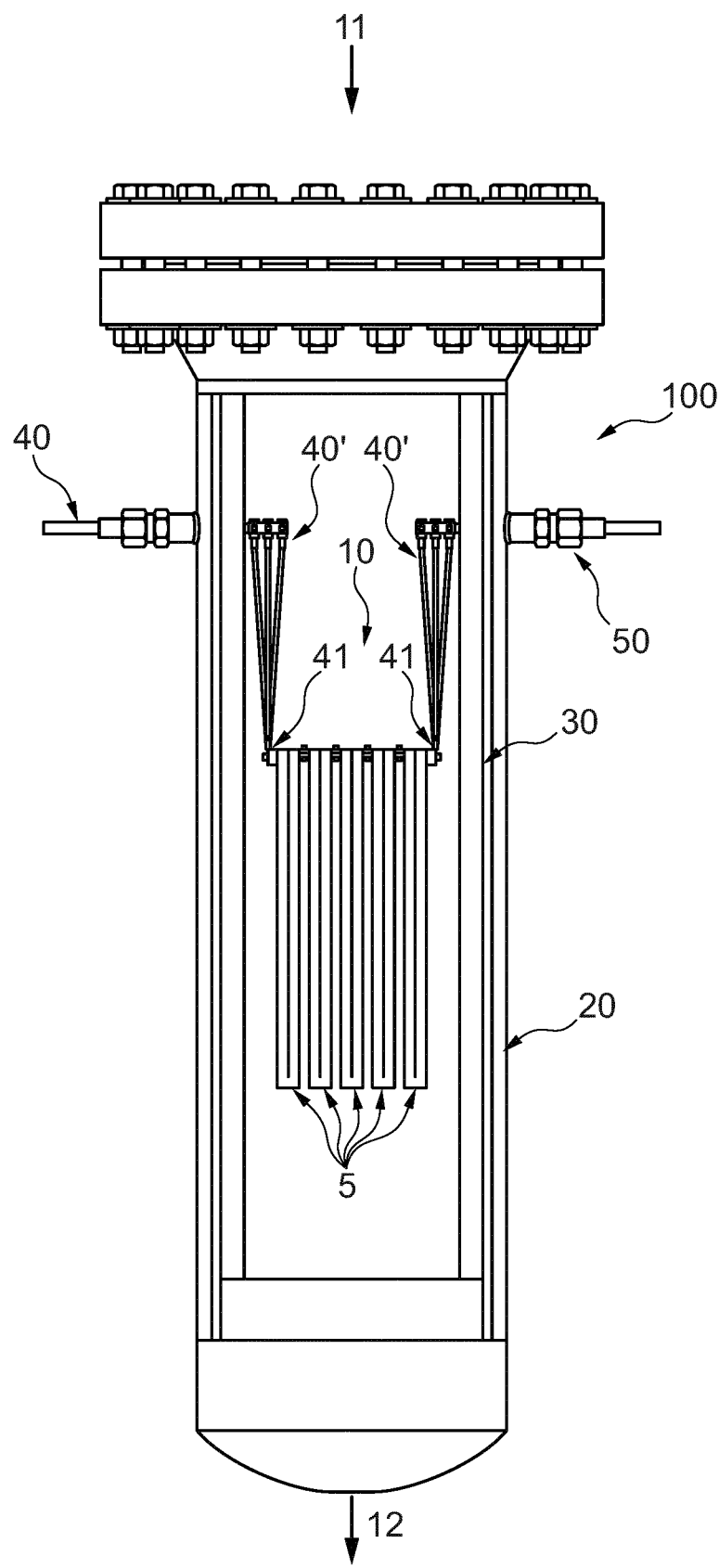
FIG. 1a illustrates a cross section through an embodiment of the inventive reactor system with a structured catalyst comprising an array of macroscopic structures, in a cross section.

Electrically heated reactors offer the possibility of making very compact chemical reactors as the heat for the reaction is delivered directly to the catalyst zone.

A compact electric reactor using monolithic catalyst can easily be operated and use easy start-up principles to produce gas when needed. This gives a relative inexpensive plant where gas can be produced in only the required amounts and little to no gas storage is needed, while transport of gas also is reduced or completely eliminated. Simple reactor equipment and simple operation of the process makes gas production attractive in delocalized plants which reduce risks of gas handling.

An embodiment of a compact electric reactor comprises a structured catalyst comprising at least one macroscopic structure and at least one connector attached to the at least one macroscopic structure. A plurality of macroscopic structures may be connected to each other in series to provide a desired electrical resistance to match a desired power rating from the associated power supply.

The plurality of macroscopic structures should be electrically connected. Electrically connecting electrical equipment needs to be carefully done to not have circuit break or local high contact resistance, and this challenge increases with increasing temperature. Consequently, typical methods for electrical connections are relative inconvenient because known methods such as welding or soldering requires space surrounding the connection means to ensure good contact.

To further optimize the size of the compact electrical reactor, void spaces in the structured catalyst may be minimized.

A structured catalyst for catalyzing an endothermic reaction of a feed gas to convert it to a product gas, it thus provided, said structured catalyst comprising at least one macroscopic structure of an electrically conductive material and at least one connector attached to the at least one macroscopic structure, wherein the macroscopic structure supports a catalytically active material, the macroscopic structure extending in a longitudinal direction from a first end to a second end, where said first end forms an inlet to said macroscopic structure for said feed gas and said second end forms an outlet for said product gas, said macroscopic structure comprising a circumferential wall encircling an internal space, wherein the connector comprises first engagement means for engaging an outer surface of the circumferential wall of a first macroscopic structure, wherein the engagement means has an inner surface with a shape matching at least a part of the outer surface of the circumferential wall, wherein the engagement means is attached to the outer surface of the circumferential wall by an interference fit, wherein the structured catalyst comprises at least two macroscopic structures, wherein the connector comprises at least two engagement means each engaging one of said macroscopic structures, and wherein the inner surfaces of said engagement means are arranged so as to allow said macroscopic structures to extend parallel to the longitudinal direction.

The connector may be attached to the at least one macroscopic structure by pressing it onto the at least one macroscopic structure. Two neighboring macroscopic structures may be attached to each other by pressing the connector onto these two neighboring macroscopic structures. This allows for easy assembling of a larger array of a plurality of macroscopic structures which are all electrically connected.

By pressing the connector onto the at least one macroscopic structure, so that the engagement means are attached to the outer surface of the circumferential wall by an interference fit, void spaces in the structured catalyst may be considerably reduced.

In the context of the present invention, 'an interference fit' (also known as a press fit or friction fit) should be understood as a fastening between two tight fitting mating parts to thereby produce a joint which is held together by friction after the parts are pushed/pressed together. The connector and the macroscopic structure(s) may be joined by applying a forced pressure, from e.g. a press, on one part to slide it over/in-to the other.

When attaching the connector to the macroscopic structure by an interference fit, the engagement means and circumferential wall match each other within 1 mm or below in a principal part of the joint as measured perpendicular to the direction of the connecting planes of the connector and the macroscopic structure, preferably within 0.1 mm or below and even more preferably within −0.1 mm. By principal part of the joint is meant at least 50%, preferably at least 75%, and even more preferably 100% of the periphery of the joint; i.e. along the inner surface of the engagement means and the outer surface of the circumferential wall. When the engagement means and circumferential wall match each other with negative distance in the principal part of the joint, deformation is expected of the principal part of the joint; i.e. either the circumferential wall or the engagement means of the connector. When the engagement means and circumferential wall match each other with a positive distance in the principal part of the joint, deformation is not expected, as the two parts are pressed together without deformation.

The structured catalyst comprising at least one macroscopic structure and at least one connector enables an easier production scheme, with simple assembly of an array.

The macroscopic structure supports a catalytically active material which may be provided at least partly on the exposed surface area of the macroscopic structure.

The close proximity between the catalytically active material and the macroscopic structure enables efficient heating of the catalytically active material by solid material heat conduction from the resistance heated macroscopic structure. An important feature of the resistance heating process is thus that the energy is supplied inside the object itself, instead of being supplied from an external heat source via heat conduction, convection and radiation. Moreover, the hottest part of the reactor system comprising the structured catalyst will be within the pressure shell of the reactor system. Preferably, the electrical power supply and the structured catalyst are dimensioned so that at least part of the structured catalyst reaches a temperature of 850° C., preferably 900° C., more preferably 1000° C. or even more preferably 1100° C. The amount and composition of the catalytically active material can be tailored to the steam reforming reaction at the given operating conditions. The surface area of the macroscopic structure, the fraction of the macroscopic structure coated with a ceramic coating, the type and structure of the ceramic coating, and the amount and composition of the catalytically active catalyst material may be tailored to the steam reforming reaction at the given operating conditions. However, it should be noted, that advantageously substantially all the surface of the macroscopic structure is coated with a ceramic coating and preferably all or most of the ceramic coating supports the catalytically active material. Preferably, only the parts of the macroscopic structure which are connected to the connector(s), are not provided with the ceramic coating.

As used herein, the term "macroscopic structure" is meant to denote a structure which is large enough to be visible with the naked eye, without magnifying devices. The dimensions of the macroscopic structure are typically in the range of tens of centimeters or of meters. Dimensions of the macroscopic structure are advantageously made to correspond at least partly to the inner dimensions of the pressure shell housing the structured catalyst, saving room for the heat insulation layer and conductors. Two or more macroscopic structures may be connected in order to provide an array of macroscopic structures having at least one of the outer dimensions in the range of meters, such as 0.5 m, 1 m, 2 m or 5 m. Such two or more macroscopic structures may be denoted "an array of macroscopic structures". In this case the dimensions of an array of macroscopic structures are advantageously made to correspond at least partly to the inner dimension of the pressure shell housing the structured catalyst (saving room for the heat insulation layer). A conceivable array of macroscopic structures could take up a volume of 0.1 to 10 $m^3$ or even larger. A "structured catalyst" may comprise a single macroscopic structure or an array of macroscopic structures, where the macroscopic structure(s) may support a ceramic coating supporting a catalytically active material. If the structured catalyst comprises an array of macroscopic structures, the macroscopic structures may be electrically connected to each other; however, alternatively, the macroscopic structures are not electrically connected to each other. Thus, the structured catalyst may comprise two or more macroscopic structures positioned adjacent to each other. The macroscopic structure(s) may be extruded and sintered structures. The macroscopic structure(s) may alternatively be 3D printed, and optionally sintered.

The physical dimensions of the macroscopic structure may be any appropriate dimensions; thus, the height may be smaller than the width of the macroscopic structure or vice versa.

The term "first end of the macroscopic structure" is meant to denote the end of the macroscopic structure where the feed gas enters the macroscopic structure, and the term "second end of the macroscopic structure" is meant to denote the end of the macroscopic structure from which the product gas exits the macroscopic structure.

The macroscopic structure may support a ceramic coating, where the ceramic coating may support the catalytically active material. The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to conductors do not have a coating thereon. The coating may be a ceramic material with pores in the structure which allows for supporting catalytically active material on and inside the coating. Advantageously, the catalytically active material comprises catalytically active particles having a size in the range from about 5 nm to about 250 nm.

The macroscopic structure may be manufactured by extrusion of a mixture of powdered metallic particles and a binder to an extruded structure and subsequent sintering of the extruded structure, thereby providing a material with a high geometric surface area per volume. Alternatively, the macroscopic structure may be 3D printed. Preferably, the extruded or 3D printed structure is sintered in a reducing atmosphere. A ceramic coating, which may contain the catalytically active material, may be provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure a high heat conductivity between the electrically heated macroscopic structure and the catalytically active material supported by the ceramic coating may be achieved, offering close and nearly direct contact between the heat source and the catalytically active material of the structured catalyst. Due to close proximity between the heat source and the catalytically active material the heat transfer is effective, so that the structured catalyst can be very efficiently heated. A compact reactor system in terms of gas processing per reactor system volume is thus possible, and therefore the reactor system housing the structured catalyst may be compact.

As used herein, the terms "3D print" and "3D printing" is meant to denote a metal additive manufacturing process. Such metal additive manufacturing processes cover 3D printing processes in which material is joined to a structure under computer control to create a three-dimensional object, where the structure is to be solidified, e.g. by sintering, to provide the macroscopic structure. Moreover, such metal additive manufacturing processes cover 3D printing processes which do not require subsequent sintering, such as powder bed fusion or direct energy deposition processes. Examples of such powder bed fusion or direct energy deposition processes are laser beam, electron beam or plasma 3D printing processes.

The electrically conductive material comprises Fe, Ni, Cu, Co, Cr, Al, Si or an alloy thereof. Such an alloy may comprise further elements, such as Mn, Y, Zr, C, Co, Mo or combinations thereof. Preferably, the electrically conductive material comprises Fe, Cr, Al or an alloy thereof. Such an alloy may comprise further elements, such as Si, Mn, Y, Zr, C, Co, Mo or combinations thereof. Preferably, the catalytically active material is particles having a size from 2 nm to 250 nm. Preferably, the conductors and the electrically conductive material are made of different materials than the electrically conductive material. The conductors may for example be of iron, nickel, aluminum, copper, silver or an alloy thereof. The ceramic coating is an electrically insulating material and will typically have a thickness in the range of around 100 μm, say 10-500 μm.

The electrically conductive material for the macroscopic structure is advantageously a coherent or consistently intra-connected material in order to achieve electrical conductivity throughout the electrically conductive material, and thereby achieve thermal conductivity throughout the structured catalyst and in particular providing heating of the catalyst material. By the coherent or consistently intra-connected material it is possible to ensure uniform distribution of current within the electrically conductive material and thus uniform distribution of heat within the structured catalyst. Throughout this text, the term "coherent" is meant to be synonymous to cohesive and thus refer to a material that is consistently intra-connected or consistently coupled. The effect of the structured catalyst being a coherent or consistently intra-connected material is that a control over the connectivity within the material of the structured catalyst and thus the conductivity of the electrically conductive material is obtained. It is to be noted that even if further modifications of the electrically conductive material are carried out, such as provision of slits within parts of the electrically conductive material or the implementation of insulating material within the electrically conductive material, the electrically conductive material is still denoted a coherent or consistently intra-connected material.

The least one macroscopic structure may comprise a plurality of internal walls in the internal space, the plurality of internal walls forming a plurality of flow channels from the first end to the second end. Thus, the macroscopic structure may have a plurality of parallel channels, a plurality of non-parallel channels and/or a plurality of labyrinthine channels, where the channels have walls defining the channels. Thereby, several different forms of the macroscopic structure can be used as long as the surface area of the structured catalyst exposed to the gas is as large as possible. In a preferred embodiment, the macroscopic structure has parallel channels, since such parallel channels render a structured catalyst with a very small pressure drop. In a preferred embodiment, parallel longitudinal channels are skewed in the longitudinal direction of the macroscopic structure. In this way, molecules of the gas flowing through the macroscopic structure will mostly tend to hit a wall inside the channels instead of just flowing straight through a channel without being in contact with a wall. The dimension of the channels should be appropriate in order to provide a macroscopic structure with a sufficient resistivity. For example, the channels could be quadratic (as seen in cross section perpendicular to the channels) and have a side length of the squares of between 1 and 3 mm; however, channels having a maximum extent in the cross section of up to about 4 cm are conceivable. The walls may e.g. have a thickness of between 0.2 and 2 mm, such as about 0.5 mm, and the ceramic coating supported by the walls may have a thickness of between 10 µm and 500 µm, such as between 50 µm and 200 µm, such as 100 µm. In another embodiment, the macroscopic structure of the structured catalyst is cross-corrugated.

In general, when the macroscopic structure is extruded or 3D printed, the pressure drop from the inlet to the outlet of the reactor system may be reduced considerably compared to a reactor where the catalyst material is in the form of pellets.

The macroscopic structure comprises a circumferential wall encircling an internal space, in which internal space the plurality of channels may extend.

The connector comprises first engagement means for engaging an outer surface of the circumferential wall of a first macroscopic structure. To facilitate attachment of the connector to the first macroscopic structure by an interference fit, the engagement means of the connector has an inner surface with a shape matching at least a part of the outer surface of the circumferential wall.

When pressing the connector onto the macroscopic structure, the outer surface of the circumferential wall may be deformed by the interference fit, whereby a consistent and lasting mechanical joint is ensure during use of the structured catalyst.

An electrical connection between the connector and the macroscopic structure may be enforced by a deformable material arranged in at least a part of the circumferential wall. The deformable material may as an example be arranged in a groove on the outer surface of the circumferential wall. Alternatively, the deformable material may be arranged as a layer covering at least a part of the outer surface of the circumferential wall. The deformable material may in one embodiment be a foil made of Ag or Sn.

The electrical connection between the connector and the macroscopic structure may alternatively or additionally be enforced by welding or soldering a part of the connector and the macroscopic structure along a part of the interference fit.

The connector may form an electrical connection to the at least one macroscopic structure at temperatures exceeding 100° C., preferably 300° C.

The engagement means may be formed as a through-hole in the connector to allow a part of the macroscopic structure to partly extend through the connector when attached by the interference fit. The macroscopic structure may be attached with e.g. the first end flush at one side of the connector, while a part of the macroscopic structure with the second end extend from the opposite side of the connector. In an alternative embodiment, the engagement means may be formed as a cavity in the connector to allow a part of the macroscopic structure to be partly inserted into the connector when attached by the interference fit.

In a preferred embodiment, the at least one macroscopic structure is substantially square-shaped in a cross-section perpendicular to the longitudinal direction. It should, however, be understood, that the at least one macroscopic structure may also have other cross-sectional shapes, such as triangular, circular, oval, pentagon, hexagon, other polygons, etc.

In a preferred embodiment, the inner surface of the engagement means forms an engagement space being substantially square-shaped in a cross-section perpendicular to the longitudinal direction to thereby match the preferred shape of the outer surface of the circumferential wall of the macroscopic structure. It should, however, be understood, that the inner surface of the engagement means may also form an engagement space of other cross-sectional shapes, such as triangular, circular, oval, pentagon, hexagon, other polygons, etc. to match the shape of the outer surface of the circumferential wall.

The connector comprises at least two engagement means, such as two engagement means, three engagement means, four engagement means, or even more engagement means. The engagement means is arranged so as to allow macroscopic structures attached to the connector to extend substantially parallel to each other, when each macroscopic structure is attached to the connector by an interference fit between the inner surface of the engagement means and the outer surface of the circumferential wall. Thus, two macroscopic structures may be attached, and may extend substantially parallel to each other. And in embodiments where the connector comprises three engagement means, three macroscopic structures may be attached, and may extend substantially parallel to each other.

In one embodiment, the connector is attached to at least two macroscopic structures at a first distance from the first end, while an additional connector is attached to the outer surface of the circumferential wall of these macroscopic structures at a second distance from the second end. The distance between the connector and the additional connector is at least twice the first distance and at least twice the second distance. The first distance and/or the second distance may be approximately zero, whereby at least one of the connector and the additional connector is attached to the at least two macroscopic structure so that at least one of the connector and the additional connector is flush with the first end and the second end, respectively.

It should by understood, that the connector as an example may be attached to a first and to a second macroscopic structure of a structure catalyst comprising more than two macroscopic structures. The additional connector may likewise be attached to the first and the second macroscopic structure. However, the additional connector may in an alternative embodiment be attached to the second macroscopic structure and to a third macroscopic structure, where the numbering of the macroscopic structures correspond to the order of the macroscopic structures arranged in row perpendicular to the longitudinal direction. Thus, the first macroscopic structure is arranged adjacent to the second macroscopic structure which is arranged between the first and the third macroscopic structure. A fourth macroscopic structure may be arranged adjacent to the third macroscopic structure. Two macroscopic structures arranged adjacent to each other when attached to the connector may be named neighbouring macroscopic structures.

In a preferred embodiment, the connector is attached to the at least one macroscopic structure at the first end, whereas the additional connector is attached to the at least one macroscopic structure at the second end.

The additional connector is formed by an electrically conductive material to form an electrical connection between the two neighbouring macroscopic structures.

The connector may be arranged so that two engagement means arranged adjacent to each other are arranged at a gap distance in the range of 2-10 mm to provide a gap between two macroscopic structures in the same range, when the two macroscopic structures are attached to the connector by an interference fit. The gap distance may be dependent on at least one of the size of the macroscopic structures, the size of the connector, the size of the reactor in which the structures catalyst is to be use, and the type of process, such a temperature range.

In addition to attaching the connector to two or more macroscopic structures so that the macroscopic structures extend substantially in parallel, two or more macroscopic structures may be attached to a connector to extend a macroscopic structure in the longitudinal direction; i.e. to extend the length of the macroscopic structure(s). This may be achieved by attaching at least two macroscopic structures to each other in the longitudinal direction via the connector, where the connector is attached to the first end of one of the macroscopic structures and to the second end of the other one of the macroscopic structures by an interference fit between the inner surface of the engagement means and the outer surface of the circumferential wall of both macroscopic structures.

In a preferred embodiment, the coefficient of thermal expansion of the material of the connector is equal to or smaller than the coefficient of thermal expansion of the material of the circumferential wall of the macroscopic structure. Thereby it may be achieved, that the interference fit is retained at higher temperatures during use of the structured catalyst.

The connector may be formed of an alloy comprising one or more substances selected from the group consisting of Fe, Cr, Al, Co, Ni, Zr, Cu, Ti, Mn, and Si. The connector(s) may be coated by a ceramic coating to thereby electrically isolate one connector from another connector.

The connector may have a thickness being defined as the dimension of the connector from the inner surface to an external surface in a direction perpendicular to the inner surface, the thickness being in the range of 1-10 mm.

The connector may have a height being defined as the dimension of the connector along the longitudinal direction, the height being in the range of 3-50 mm.

In a preferred embodiment, the electrically conductive material of the macroscopic structure is an alloy comprising one or more substances selected from the group consisting of Fe, Cr, Al, Co, Ni, Zr, Cu, Ti, Mn, and Si.

The macroscopic structure may have a length being defined as the dimension of the macroscopic structure in the longitudinal direction, the length being in the range of 0.1-5 m. In embodiments, in which two macroscopic structures are joined by the connector in the longitudinal direction, the extended macroscopic structure may thus have a length of up to 10 m.

A reactor system for carrying out an endothermic reaction of a feed gas is provided, said reactor system comprising:
a) a structured catalyst as described above;
b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
c) a heat insulation layer between said structured catalyst and said pressure shell.

It should be understood, that a skilled person would readily recognise that any feature described in combination with the structured catalyst could also be combined with the reactor system for carrying out an endothermic reaction of a feed gas, and vice versa.

The structured catalyst described above is very suitable for the reactor system for carrying out an endothermic reaction of a feed gas. The remarks set forth above in relation to the structured catalyst are therefore equally applicable in relation to the reactor system.

The layout of the reactor system allows for feeding a pressurized feed gas to the reactor system at an inlet and directing this gas into the pressure shell of the reactor system. Inside the pressure shell, a configuration of heat insulation layers and inert material is arranged to direct the feed gas through the channels of the structured catalyst where it will be in contact with the ceramic coating and the catalytically active material supported on the ceramic coatings, where the catalytically active material will facilitate the steam reforming reaction. Additionally, the heating of the structured catalyst will supply the required heat for the endothermic reaction. The product gas from the structured catalyst is led to the reactor system outlet.

In a particular embodiment of the invention, the reactor system comprises at least two conductors connected to the structured catalyst so as to allow connection to a power supply. When the pressure shell comprises an inlet for letting in process gas and an outlet for letting out product gas, where the inlet is positioned so that the feed gas enters the structured catalyst in a first end of the structured catalyst and the product gas exits the structured catalyst from a second end of the structured catalyst, and when the at least two conductors both are connected to the structured catalyst at a position on the structured catalyst closer to the inlet than to the outlet, the at least two conductors can be placed in the relatively colder part of the reactor system. The first end of the structured catalyst has a lower temperature than the second end of the structured catalyst due to:
the feed gas fed led through the inlet may cool the at least two conductors be-fore being heated by the structured catalyst further along the path of the gas through the structured catalyst;
the feed gas inlet into the first end of the structured catalyst will have lower temperature than the product gas leaving the second end of the structured catalyst, due to the heat supplied to the structured catalyst electrically,
The endothermic nature of the steam reforming reaction absorbs heat,
The structured catalyst is constructed to direct an electrical current to run from one conductor substantially to the second end of the structured catalyst and return to a second of the at least two conductors.

In one embodiment, at least one of the conductors is connected to a conductor connector. The conductor connector may thus comprise a conductor contact rail for connection of a conductor. In a particular embodiment, the conductor connector comprises first engagement means for engaging an outer surface of the circumferential wall of a first macroscopic structure. In a particular embodiment, the engagement means has an inner surface with a shape matching at least a part of the outer surface of the circumferential wall. In a particular embodiment, the engagement means is attached to the outer surface of the circumferential wall by an interference fit.

The temperature profile in the structured catalyst may correspond to a substantially continuously increasing temperature along the path of the feed gas through the structured catalyst.

The reactor system of the invention does not need a furnace and this reduces the overall reactor size considerably. Moreover, it is an advantage that the amount of synthesis gas produced in a single pressure shell is increased considerably compared to known tubular steam reformers. In a standard tubular steam reformer, the amount of synthesis gas produced in a single tube of the tubular steam reformer is up to 500 Nm$^3$/h. In comparison, the reactor system of the invention is arranged to produce up to or more than 2000 Nm$^3$/h, e.g. even up to or more than 10000 Nm$^3$/h, within a single pressure shell. This can be done without the presence of $O_2$ in the feed gas and with less than 10% methane in the synthesis gas produced. When a single pressure shell houses catalyst for producing up to 10000 Nm³/h synthesis gas, it is no longer necessary to provide a plurality of pressure shells or means for distributing feed gas to a plurality of such separate pressure shells.

Another advantage of the reactor system is that the flow through the structured catalyst within the reactor system may be upflow, due to the structured catalyst comprising a macroscopic structure. Alternatively, the flow through the structured catalyst could be in the horizontal direction or any other appropriate direction. This is more difficult in the case where the reactor contains pellets due to the risk of fluidization, grinding, and blowing out the pellets. Thereby, a substantial amount of piping may be avoided, thus reducing plant costs. Furthermore, the possibility of upflow or horizontal flow increases the flexibility in plant design.

Moreover, it should be noted that the term "the at least two conductors are connected to the structured catalyst at a position on the structured catalyst closer to the first end of the structured catalyst than to the second end of the structured catalyst" is meant to denote that both/all of the at least two conductors are connected closer to the first end of the structured catalyst than to the second end. Preferably, the at least two conductors are connected to first end of the structured catalyst or within the quarter of the length of the/a macroscopic structure closest to the first end.

Use of the structured catalyst described above or the reactor described above is provided, wherein the endothermic reaction is selected from the group consisting of steam methane reforming, hydrogen cyanide formation, methanol cracking, ammonia cracking, reverse water gas shift and dehydrogenation.

It should be understood, that a skilled person would readily recognise that any feature described in combination with the structured catalyst and the reactor system for carrying out an endothermic reaction of a feed gas is applicable for this use. The remarks set forth above in relation to the structured catalyst and the reactor system are therefore equally applicable in relation to the use hereof.

DETAILED DESCRIPTION OF THE FIGURES

Throughout the Figures, like reference numbers denote like elements.

FIG. 1a shows a cross section through an embodiment of a reactor system 100 according to the invention. The reactor system 100 comprises a structured catalyst 10, arranged as an array of macroscopic structures 5. Each macroscopic structure 5 in the array is coated with a ceramic coating impregnated with catalytically active material. The reactor system 100 moreover comprises conductors 40, 40' connected to a power supply (not shown in the Figures) and to the structured catalyst 10, viz. the array of macroscopic structures. The conductors 40, 40' are led through the wall of a pressure shell 20 housing the structured catalyst and through insulating material 30 on the inner side of the pressure shell, via fittings 50. The conductors 40' are connected to the array of macroscopic structures 5 by conductor contact rails 41.

In an embodiment, the electrical power supply supplies a voltage of 26V and a current of 1200 A. In another embodiment, the electrical power supply supplies a voltage of 5V and a current of 240 A. The current is led through electrical conductors 40, 40' to conductor contact rails 41, and the current runs through the structured catalyst 10 from one conductor contact rail 41, e.g. from the conductor contact rail seen to the left in FIG. 1a, to the other conductor contact rail 41, e.g. the conductor contact rail seen to the right in FIG. 1a. The current can be both alternating current, and e.g. run alternating in both directions, or direct current and run in any of the two directions.

The macroscopic structures 5 are made of electrically conductive material. Especially preferred is the alloy kanthal consisting of aluminum, iron and chrome. The ceramic coating, e.g. an oxide, coated onto the structure catalysts 5 is impregnated with catalytically active material. The conductors 40, 40' are made in materials like iron, aluminum, nickel, copper or alloys thereof.

During operating, a feed gas enters the reactor system 100 from above as indicated by the arrow 11. Product gas exits the reactor system from the bottom thereof as indicated by the arrow 12.

Figure 1B:
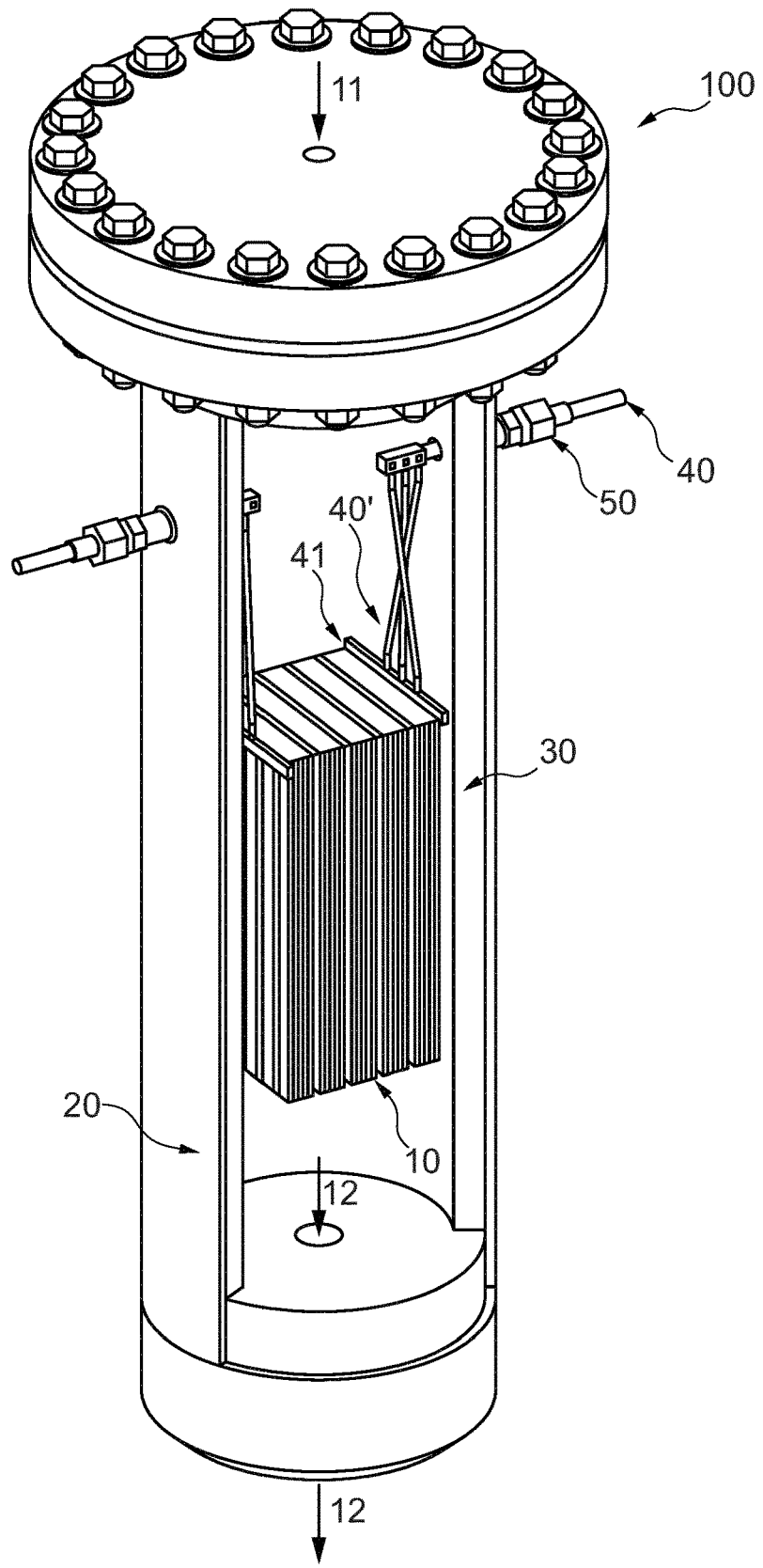
FIG. 1b illustrates the reactor system of FIG. 1a with a part of the pressure shell and heat insulation layer removed.
Figure 2:
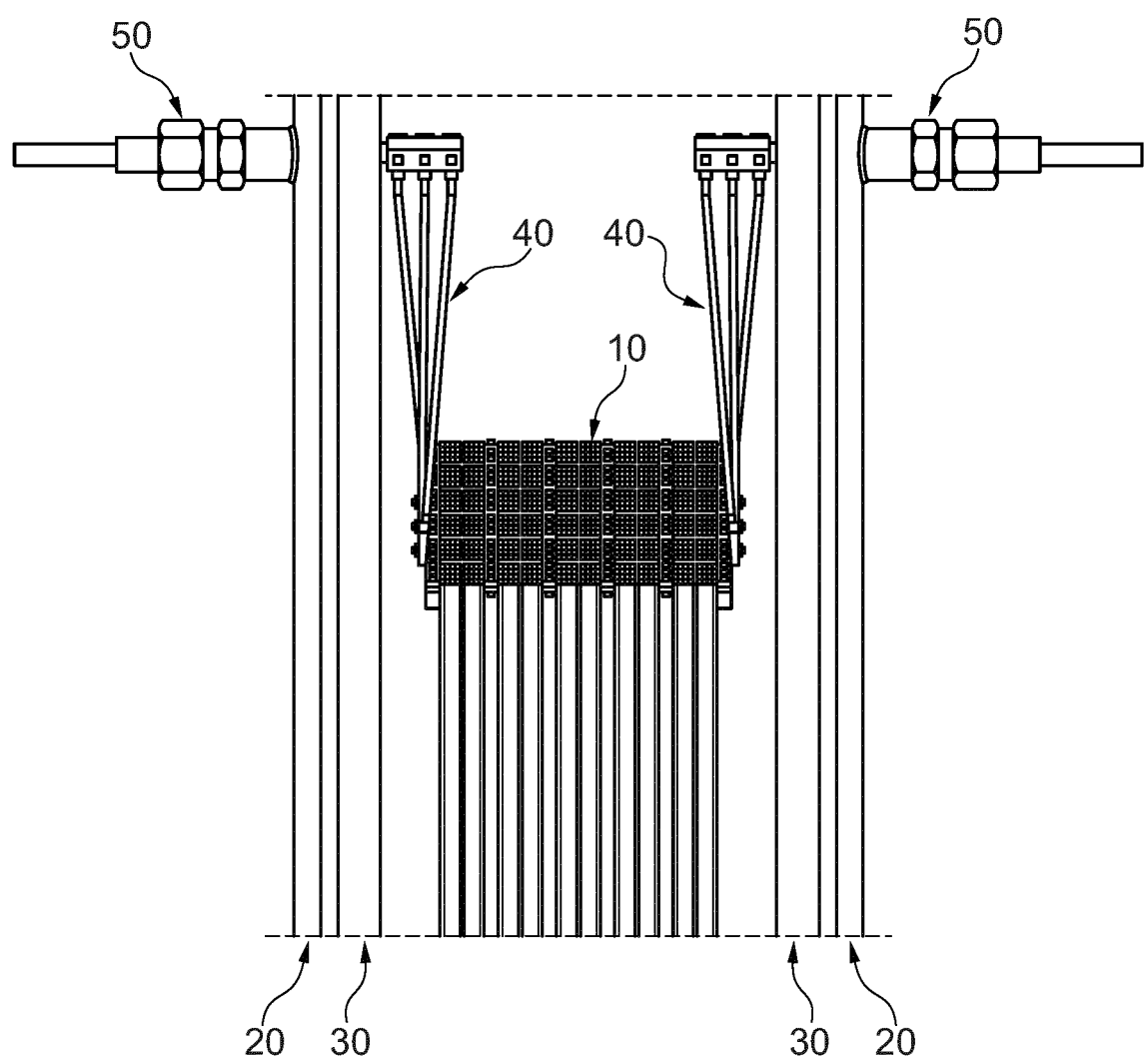
FIG. 2 is an enlarged view of a part of the reactor system.

FIG. 1b shows the reactor system 100 of FIG. 1a with a part of the pressure shell 20 and heat insulation 30 layer removed and FIG. 2 is an enlarged view of a part of the reactor system 100. In FIGS. 1b and 2, the connections between conductors 40' and conductor contact rails 41 are shown more clearly than in FIG. 1a. Moreover, it is seen that the conductors 40 are led through the walls of the pressure shell in a fitting 50, and that the one conductor 40 is split up into three conductors 40' within the pressure shell. It should be noted, that the number of conductors 40' may be any appropriate number, such as smaller than three or even larger than three.

In the reactor system shown in FIGS. 1a, 1b and 2, the conductors 40, 40' are led through the wall of a pressure shell 20 housing the structured catalyst and through insulating material 30 on the inner side of the pressure shell, via fittings 50. Feed gas for the endothermic reaction is inlet into the reactor system 100 via an inlet in the upper side of the reactor system 100 as shown by the arrow 11, and product gas exits the reactor system 100 via an outlet in the bottom of the reactor system 100 as shown by the arrow 12. Moreover, one or more additional inlets (not shown in FIGS. 1a to 2) advantageously exist close to or in combination with the fittings 50. Such additional inlets allow a cooling gas to flow over, around, close to, or inside at least one conductor within the pressure shell to reduce the heating of the fitting. The cooling gas could e.g. be hydrogen, nitrogen, methane or mixtures thereof. The temperature of the cooling gas at entry into the pressure shell may be e.g. about 100° C.

In the reactor system 100 shown in FIGS. 1a to 2, inert material (not shown in FIGS. 1a-2) is advantageously present between the lower side of the structured catalyst 10 and the bottom of the pressure shell. Moreover, inert material is advantageously present between the outer sides of the structured catalyst 10 of macroscopic structures 5 and the insulating material 30. Thus, one side of the insulating material 30 faces the inner side of the pressure shell 20 and the other side of the insulating material 30 faces the inert material. The inert materiel is e.g. ceramic material and may be in the form of pellets. The inert material assists in controlling the pressure drop across the reactor system 100 and in controlling the flow of the gas through the reactor system 100, so that the gas flows over the surfaces of the structured catalyst 10.

Figure 3:
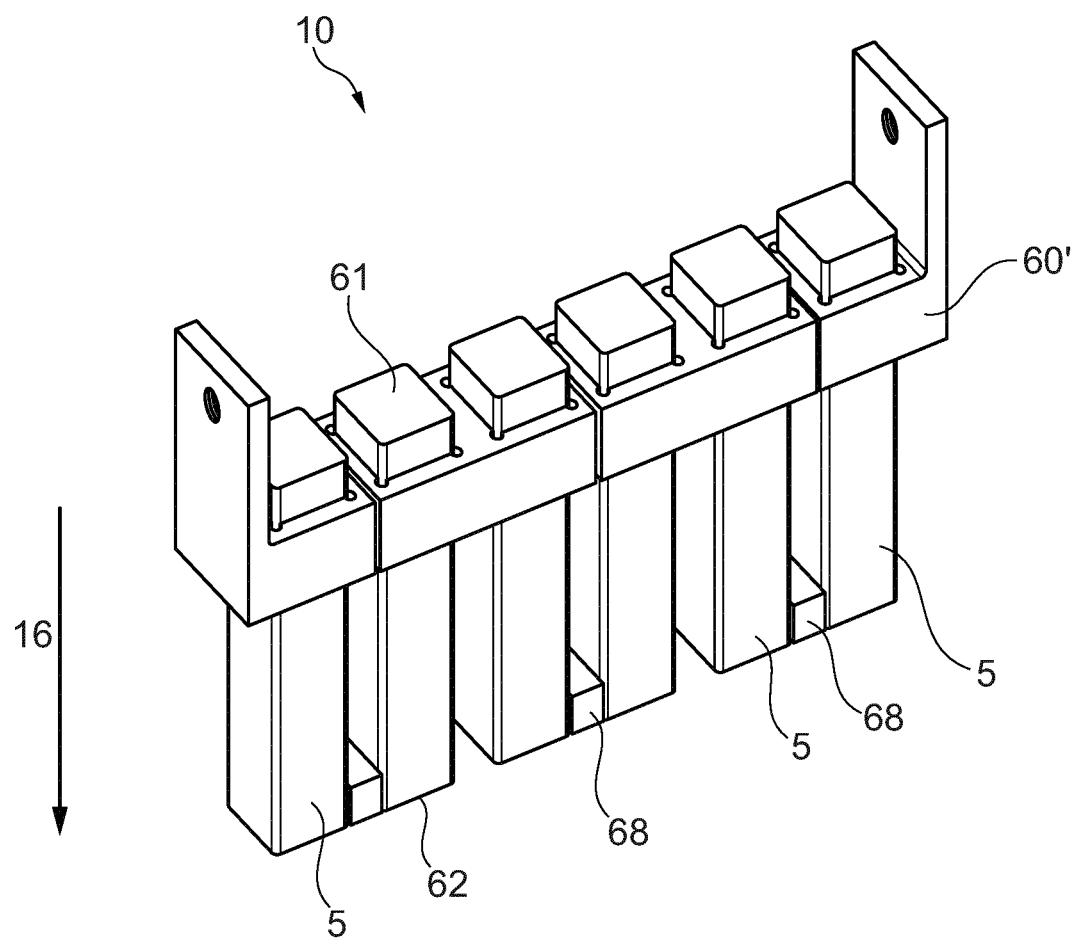
FIG. 3 illustrates a structured catalyst comprising six macroscopic structures and four connectors.

FIG. 3 illustrates a structured catalyst comprising six macroscopic structures 5 and four connectors 60, 60'. The macroscopic structures 5 extend in a longitudinal direction from a first end to a second end as indicated by the arrow 16. The first end 61 forms an inlet to the macroscopic structure for a feed gas and the second end 62 forms an outlet for a product gas.

The macroscopic structure 5 comprises a circumferential wall 65 encircling an internal space. The connector 5 comprises first engagement means 67 (see e.g. FIGS. 4 and 5) for engaging an outer surface of the circumferential wall 65 of a first macroscopic structure. The engagement means 67 is formed as a through-hole in the connector 60, 60' to allow a part of the macroscopic structure 5 to partly extend through the connector 60 when attached by the interference fit.

The engagement means 67 has an inner surface with a shape matching at least a part of the outer surface of the circumferential wall 65. The engagement means 67 is attached to the outer surface of the circumferential wall 65 by an interference fit.

An additional connector 68 is attached to the outer surface of the circumferential wall 65 of two neighbouring macroscopic structures 5 at the second end 62.

The connectors 60, 60' are attached to the macroscopic structures 5 at a first distance being approximately 10 mm from the first end. The additional connectors 68 are attached to the macroscopic structures 5 so that the additional connectors 68 are flush with the second end 62.

The flow channel structure of the macroscopic structure 5 is omitted from FIG. 3 for simplicity of the drawing.

Figure 4:
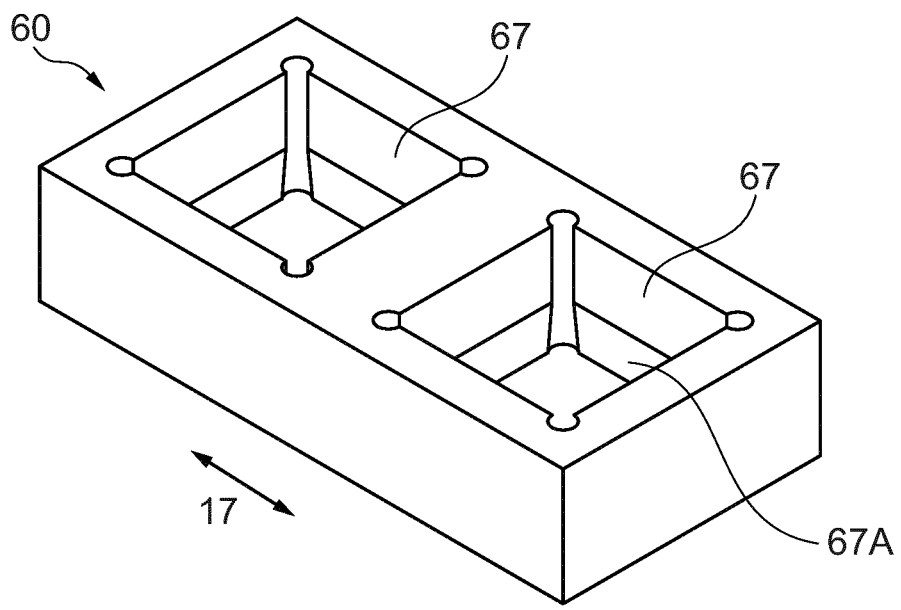
FIG. 4 illustrates a connector.

FIG. 4 illustrates an embodiment of a connector 60. The illustrated connector 60 comprises two engagement means 67. The engagement means 67 are arranged substantially parallel to each other in a direction substantially perpendicular to longitudinal direction to allow two macroscopic structures 5 extend substantially parallel to each other, when each macroscopic structure 5 is attached to the connector by an interference fit between the inner surface of one of the engagement means 67 and the outer surface of the circumferential wall.

The connector 60 is provided with a gap distance, illustrated by the arrow 17, in the range of 2-10 mm to provide a gap between two neighbouring macroscopic structures in the same range, when two neighbouring macroscopic structures are attached to the connector 60 by an interference fit.

The interference fit is facilitated by manufacturing the connector with a lower part 67A being conical to facilitate guiding of the macroscopic structure into a tight fit position in the connector.

Figure 5:
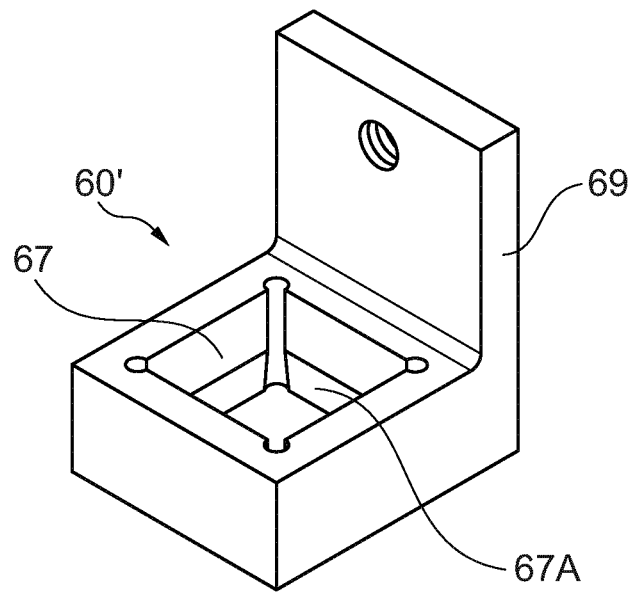
FIG. 5 illustrates a connector.

FIG. 5 illustrates an embodiment of a connector 60'. The illustrated connector 60' comprises a single engagement means 67. The engagement means 67 is configured for attachment of a single macroscopic structure 5 by an interference fit between the inner surface of one of the engagement means 67 and the outer surface of the circumferential wall.

The connector 60' further comprises a flange 69. The flange 69 may comprise a conductor contact rail (41, not shown) for connection of a conductor (40, 40', nor shown).

The illustrated embodiments of the macroscopic structures 5 have a substantially square-shaped cross-section perpendicular to the longitudinal direction. And the engagement means 67 are substantially square-shaped in a cross-section perpendicular to the longitudinal direction to thereby match the shape of the outer surface of the circumferential wall 65 of the macroscopic structure 5.

The interference fit is facilitated by manufacturing the connector with a lower part 67A being conical to facilitate guiding of the macroscopic structure into a tight fit position in the connector.

Figure 6:
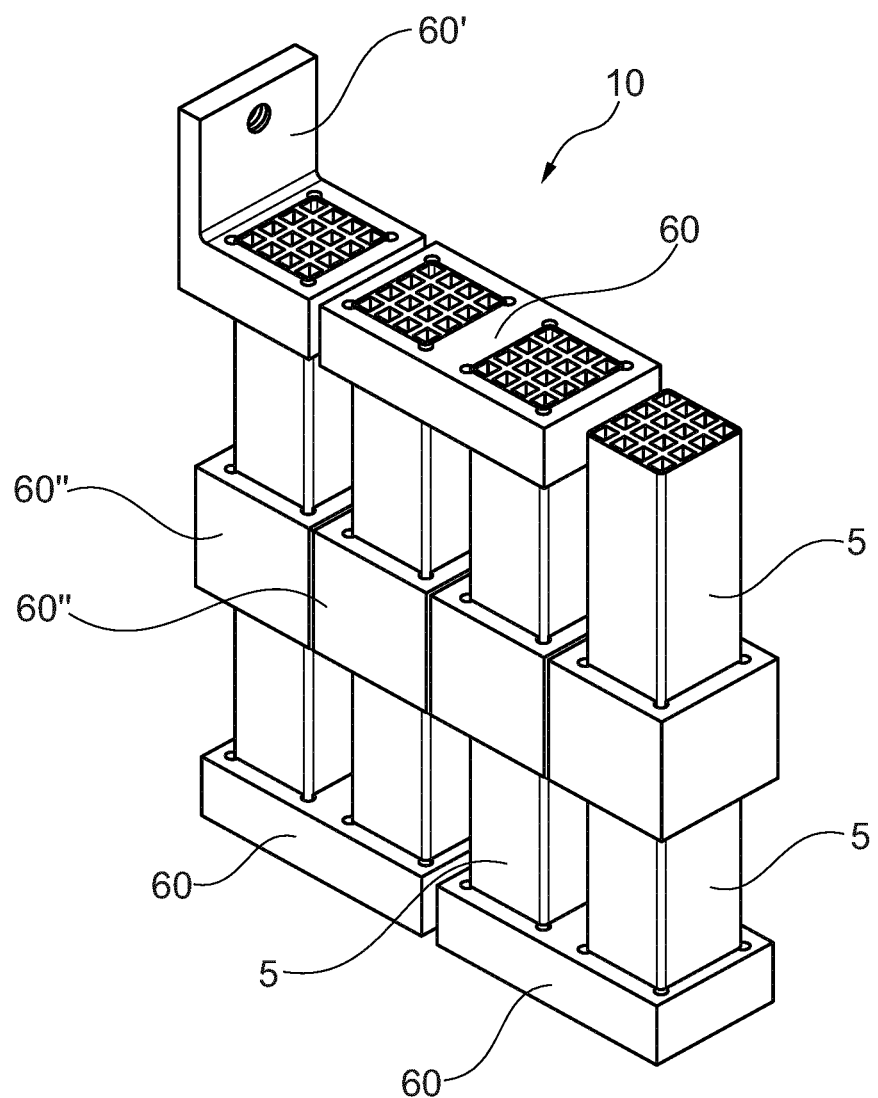
FIG. 6 illustrates a structured catalyst comprising a plurality of macroscopic structures and a plurality of connectors.

FIG. 6 illustrates a structured catalyst 10 comprising a plurality of macroscopic structures 5 and a plurality of connectors 60, 60', 60" attached to the macroscopic structures 5. Some of the connectors 60, 60' are identical to the connectors 60, 60' illustrated in the FIGS. 4, 5, and 6. And alternative connector 60" for extending the macroscopic structures 5 is also illustrated.

Figure 7A:
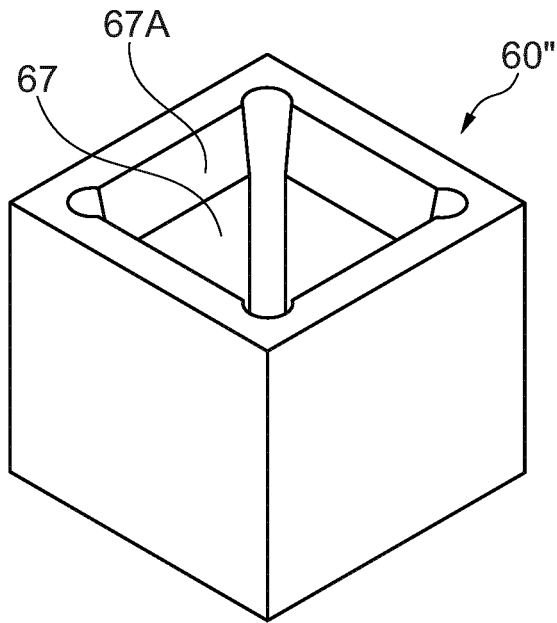
FIG. 7a illustrates a connector.

FIG. 7a illustrates a connector 60". Two macroscopic structures 5 are attached to the connector 60" to extend the length of a macroscopic structure 5 in the longitudinal direction.

The two macroscopic structures 5 are attached to each other in the longitudinal direction via the connector 60", where the connector 60" is attached to the first end of one of the macroscopic structures 5 and to the second end of the other one of the macroscopic structures 5 by an interference fit between the inner surface of the engagement means 67 and the outer surface of the circumferential wall 65 of both macroscopic structures.

Figure 7B:
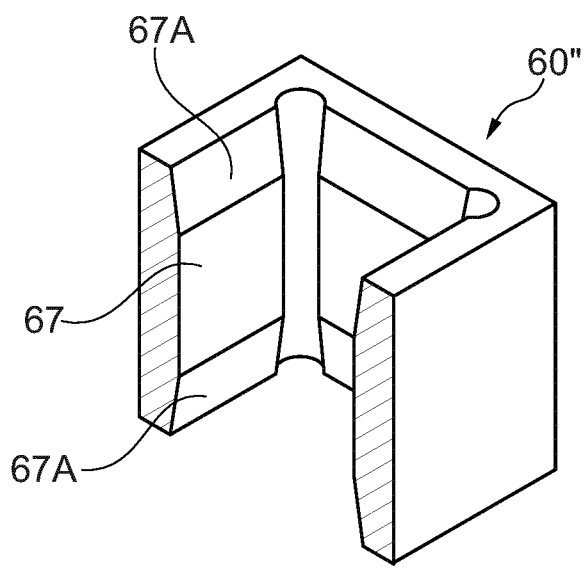

FIG. 7b illustrates a sectional view of the connector 60" illustrated in FIG. 7a.

In the illustrated embodiment, the connector 60" connects two macroscopic structures 5. It should be understood that the connector 60 and the connector 60" may be combined to thereby provide an alternative embodiment of a connector which provides the possibility of extending the length of microscopic structures while at the same time arranging the microscopic structures in parallel and attached to each other.

The interference fit is facilitated by manufacturing the connector with a lower part 67A and an upper part 67A, both being conical to facilitate guiding of two macroscopic structures into a tight fit position in the connector to thereby provide an extended macroscopic structure.

Figure 8:
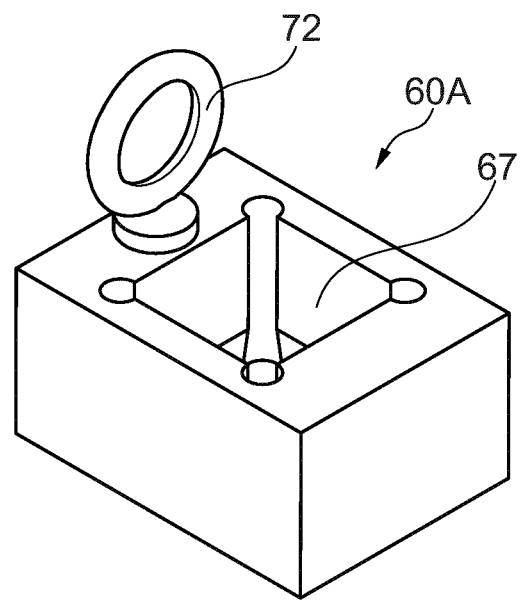
FIG. 8 illustrates a connector.

FIG. 8 illustrates a further embodiment of a connector 60A. The connector 60A comprises a lug 72 enabling lifting of the connector 60A and lifting of a structured catalyst by use of the lug 72. A macroscopic structure 5 may be attached to the connector 60A by an interference fit between the engagement means 67 and an outer surface of the circumferential wall of the macroscopic structure.

Figure 9:
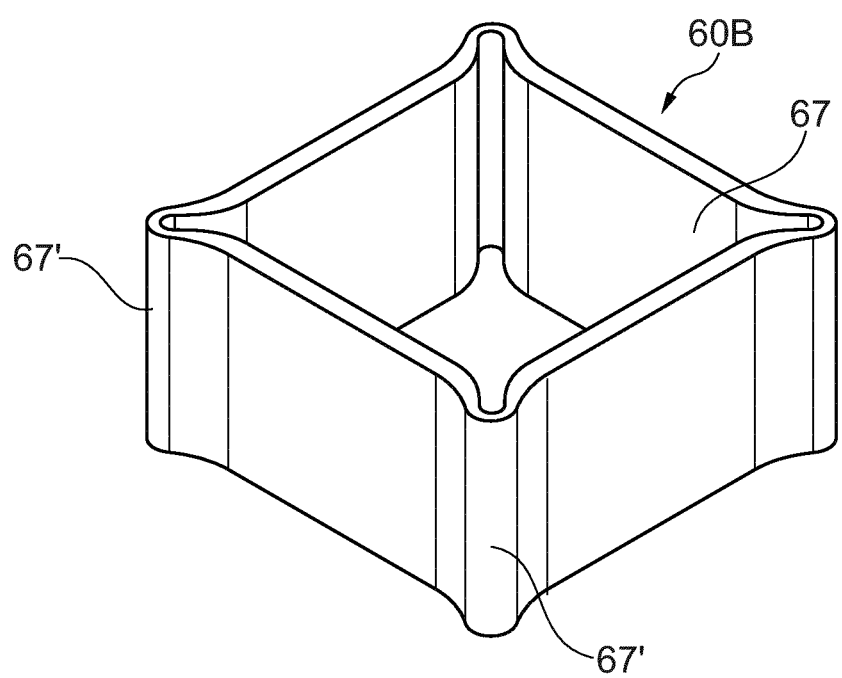
FIG. 9 illustrates a connector.

FIG. 9 illustrates a further embodiment of a connector 60B. The connector 60B comprises engagement means 67 for attachment of a macroscopic structure (not shown). The connector 60B comprises additional engagement means 67' in the form of engagement corners. When a macroscopic structure has been inserted into the through-hole of the connector 60B, the engagement corners 67' may be squished to further fasten the macroscopic structure to the connector 60B.

Figure 10:
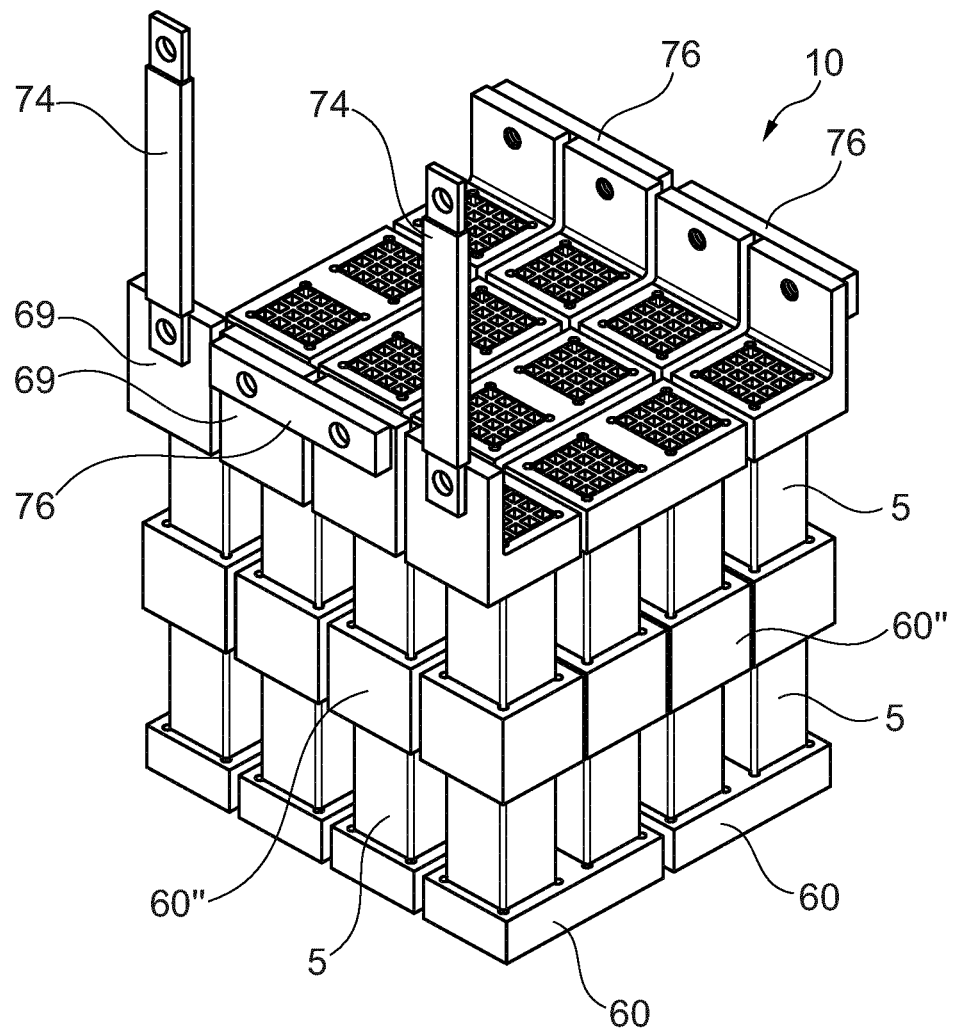
FIG. 10 illustrates a structured catalyst comprising a plurality of macroscopic structures connected by a plurality of connectors attached to the macroscopic structures.

FIG. 10 illustrates a structured catalyst 10 comprising a plurality of macroscopic structures 5 connected by a plurality of connectors 60, 60', 60" attached to the macroscopic structures 5. The flanges 69 are used for connection to an external power source via the bars 74 and a conductor contact rail (not shown). Additionally, the flanges 69 are used to connect two neighbouring macroscopic structures 5 via the bars 76.

The invention claimed is:

1. A structured catalyst for catalyzing an endothermic reaction of a feed gas to convert it to a product gas, said structured catalyst comprising at least one macroscopic structure of an electrically conductive material and at least one connector attached to the at least one macroscopic structure, wherein the macroscopic structure supports a catalytically active material, the macroscopic structure extending in a longitudinal direction from a first end to a second end, where said first end forms an inlet to said macroscopic structure for said feed gas and said second end forms an outlet for said product gas, said macroscopic structure comprising a circumferential wall encircling an internal space, wherein the connector comprises first engagement means for engaging an outer surface of the circumferential wall of a first macroscopic structure, wherein the engagement means has an inner surface with a shape matching at least a part of the outer surface of the circumferential wall, wherein the engagement means is attached to the outer surface of the circumferential wall by an interference fit, wherein the structured catalyst comprises at least two macroscopic structures, wherein the connector comprises at least two engagement means each engaging one of said macroscopic structures, and wherein the inner surfaces of said engagement means are arranged so as to allow said macroscopic structures to extend parallel to the longitudinal direction.

2. The structured catalyst according to claim 1, wherein the outer surface of the circumferential wall is deformed by the interference fit.

3. The structured catalyst according to claim 1, wherein electrical connection between the connector and the macroscopic structure is enforced by a deformable material arranged in at least a part of the circumferential wall.

4. The structured catalyst according to claim 1, wherein electrical connection between the connector and the macroscopic structure is enforced by welding or soldering the connector and the macroscopic structure along a part of the interference fit.

5. The structured catalyst according to claim 1, wherein the connector forms an electrical connection to the at least one macroscopic structure at temperatures exceeding 100° C.

6. The structured catalyst according to claim 1, wherein the engagement means is formed as a through-hole in the connector to allow a part of the macroscopic structure to partly extend through the connector when attached by the interference fit.

7. The structured catalyst according to claim 1, wherein the least one macroscopic structure comprises a plurality of internal walls in the internal space, the plurality of internal walls forming a plurality of flow channels from the first end to the second end.

8. The structured catalyst according to claim 1, wherein the at least one macroscopic structure is substantially square-shaped in a cross-section perpendicular to the longitudinal direction.

9. The structured catalyst according to claim 1, wherein the inner surface of the engagement means forms an engagement space being substantially square-shaped in a cross-section perpendicular to the longitudinal direction.

10. The structured catalyst according to claim 1, wherein the connector is attached to said at least two macroscopic structures at a first distance from the first end, and wherein an additional connector is attached to the outer surface of the circumferential wall of said macroscopic structures at a second distance from the second end, wherein the distance between the connector and the additional connector is at least twice the first distance and at least twice the second distance.

11. The structured catalyst according to claim 1, wherein said engagement means are arranged at a gap distance in the range of 2-10 mm to provide a gap between said macroscopic structures in the same range.

12. The structured catalyst according to claim 10, wherein the additional connector is formed by an electrically conductive material to form an electrical connection between the two neighbouring macroscopic structures.

13. The structured catalyst according to claim 1, wherein at least two macroscopic structures are attached to each other in the longitudinal direction via a connector, the connector being attached to the first end of one of the macroscopic structures and to the second end of the other one of the macroscopic structures by an interference fit between the inner surface of the engagement means and the outer surface of the circumferential wall of both macroscopic structures.

14. The structured catalyst according to claim 1, wherein the connector is formed of an alloy comprising one or more substances selected from the group consisting of Fe, Cr, Al, Co, Ni, Zr, Cu, Ti, Mn, and Si.

15. The structured catalyst according to claim 1, wherein the coefficient of thermal expansion of the material of the connector is equal to or smaller than the coefficient of thermal expansion of the material of circumferential wall of the macroscopic structure.

16. The structured catalyst according to claim 1, wherein the connector has a thickness being defined as the dimension of the connector from the inner surface to an external surface in a direction perpendicular to the inner surface, the thickness being in the range of 1-10 mm.

17. The structured catalyst according to claim 1, wherein the connector has a height being defined as the dimension of the connector along the longitudinal direction, the height being in the range of 3-50 mm.

18. The structured catalyst according to claim 1, wherein the electrically conductive material is an alloy comprising one or more substances selected from the group consisting of Fe, Cr, Al, Co, Ni, Zr, Cu, Ti, Mn, and Si.

19. The structured catalyst according to claim 1, wherein the macroscopic structure has a length being defined as the dimension of the macroscopic structure in the longitudinal direction, the length being in the range of 0.1-5 m.

20. A reactor system for carrying out an endothermic reaction of a feed gas, said reactor system comprising:
   a) a structured catalyst of claim 1;
   b) a pressure shell housing said structured catalyst, said pressure shell comprising an inlet for letting in said feed gas and an outlet for letting out product gas, wherein said inlet is positioned so that said feed gas enters said structured catalyst in a first end and said product gas exits said catalyst from a second end; and
   c) a heat insulation layer between said structured catalyst and said pressure shell.

21. A method of conducting an endothermic reaction comprising using the structured catalyst according to claim 1, wherein the endothermic reaction is selected from the group consisting of steam methane reforming, hydrogen cyanide formation, methanol cracking, ammonia cracking, reverse water gas shift and dehydrogenation.

* * * * *